US006514306B1

(12) United States Patent
Rohrbach et al.

(10) Patent No.: US 6,514,306 B1
(45) Date of Patent: Feb. 4, 2003

(54) ANTI-MICROBIAL FIBROUS MEDIA

(75) Inventors: Ronald P. Rohrbach, Flemington, NJ (US); Peter D. Unger, Morristown, NJ (US); Gordon William Jones, Toledo, OH (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/492,665

(22) Filed: Jan. 27, 2000

(51) Int. Cl.$^7$ ................................................ B01D 39/02
(52) U.S. Cl. ................. 55/524; 55/527; 55/DIG. 5; 95/211; 96/154; 96/290; 96/296; 261/104; 261/107; 422/120
(58) Field of Search .......................... 55/522, 524, 527, 55/DIG. 5; 96/154, 290, 226, 227; 95/211; 261/104, 107; 428/372, 398; 424/19, 426; 422/120

(56) References Cited

U.S. PATENT DOCUMENTS

| | | | | |
|---|---|---|---|---|
| 3,116,969 A | * | 1/1964 | Coleman | 96/227 |
| 4,045,192 A | * | 8/1977 | Eckstein et al. | 96/226 |
| 4,468,372 A | * | 8/1984 | Seifert et al. | 96/226 |
| 4,525,411 A | | 6/1985 | Schidt | |
| 4,584,188 A | * | 4/1986 | Graham | 424/19 |
| 4,631,297 A | * | 12/1986 | Battice et al. | 96/226 |
| 5,057,368 A | | 10/1991 | Largman et al. | |
| 5,487,412 A | | 1/1996 | Matthews et al. | |
| 5,704,966 A | | 1/1998 | Rohrbach et al. | |
| 5,713,971 A | | 2/1998 | Rohrbach et al. | |
| 5,714,159 A | * | 2/1998 | Shalaby | 424/426 |
| 5,744,236 A | | 4/1998 | Rohrbach et al. | |
| 5,759,394 A | | 6/1998 | Rohrbach et al. | |
| 5,843,375 A | * | 12/1998 | Emerson et al. | 96/226 |
| 5,874,052 A | * | 2/1999 | Holland | 55/524 |
| 5,876,489 A | * | 3/1999 | Kunisaki et al. | 55/524 |
| 5,902,384 A | | 5/1999 | Rohrbach et al. | |
| 5,951,744 A | | 9/1999 | Rohrbach et al. | |
| 6,110,249 A | * | 8/2000 | Medcalf et al. | 55/524 |

FOREIGN PATENT DOCUMENTS

| | | |
|---|---|---|
| EP | 0 852 148 A | 7/1998 |
| WO | WO 94 11556 | 5/1994 |

* cited by examiner

*Primary Examiner*—David A. Simmons
*Assistant Examiner*—Minh-Chau T. Pham

(57) ABSTRACT

A fibrous element is described. The fibrous element includes a container member and an anti-microbial agent, wherein the anti-microbial agent is disposed within the container member. The container member can include structures such as an elongated fiber having multiple lobes with a longitudinally extending internal cavity including an opening from the internal cavity to the outer fiber formed between adjacent lobes, an elongated fiber having an internal longitudinally extending cavity having a longitudinally extending opening, and a particulate. The anti-microbial agent is capable of diffusing out of the container member and throughout the fibrous element in response to elevated relative humidity levels in order to contact and kill a microbial population.

13 Claims, 2 Drawing Sheets

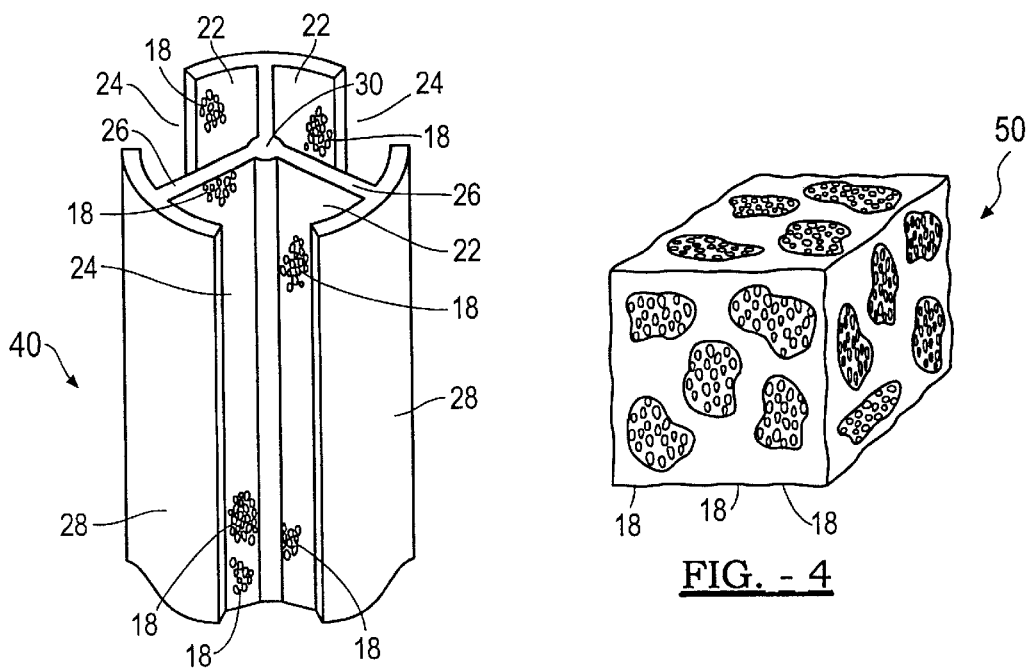
FIG. - 3
FIG. - 4
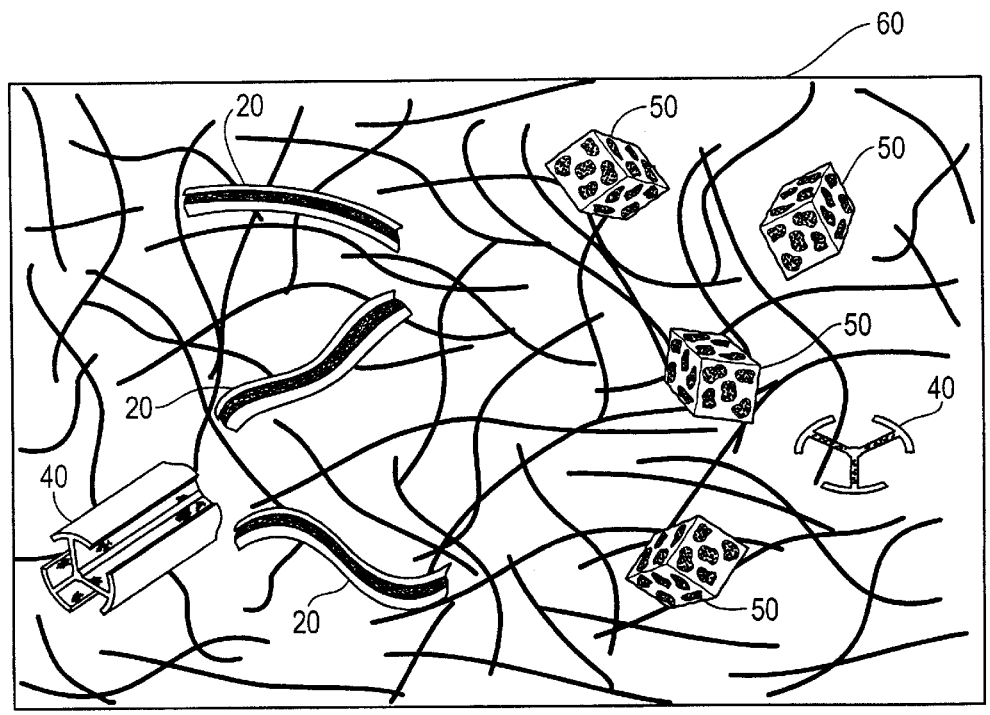
FIG. - 5

ANTI-MICROBIAL FIBROUS MEDIA

BACKGROUND OF THE INVENTION

1. Technical Field

The present invention relates generally to fibrous media, and more particularly to fibrous media having anti-microbial agents contained therein.

2. Discussion

Conventional filtration systems, especially those employed for air filtration in homes and automobiles, typically employ a filter element comprised of a web, mat, or sheet of filter media in order to trap and retain particulate matter entrained in an air flow that passes through the filter media. Although conventional filter media generally perform well in dry or arid environments, there are some problems associated with operation in moist or humid environments.

Specifically, if conventional air filter media are operated for extended periods of time while exposed to elevated levels of relative humidity (i.e., greater than 50%), the media can often become a source of offensive odors resulting from the microbial proliferation on the surface thereof, which is especially problematic for homeowners that have air conditioning systems located in damp basements. The microbial proliferation is due, in part, to the concentration of nutrients and water on the filter media surface.

In an effort to overcome this problem, filter manufacturers have applied various anti-microbial agents in the form of finishes and coatings to various fibrous materials, including textiles, clothing, surgical drapes, and so forth. However, virtually all of these anti-microbial finishes suffer from one or more disadvantages which severely impacts their ability to be effective for their intended purpose.

Most of the anti-microbial finishes rely on a stable anti-microbial layer covalently bound to the fiber surface so that it is "wash fast" (i.e., will not be removing during normal laundering). This approach is ineffective to overcome the present problem because it does not allow the anti-microbial agent to be liberated and freely mobile to diffuse throughout the "fouled" layer and come in contact with the bio-active layer which is typically on the very outermost surface. Basically, the bulk of the anti-microbial agent is uniformly dispersed throughout the filter media, such as on fibers located in the interior of the filter element, and is, of course, not effective in repelling the growth of microbial populations on the exterior surface of the filter element. Accordingly, the overall anti-microbial capacity is low because the microbial population never comes into contact with an appreciable amount of the anti-microbial agent at an earlier enough stage. As a result; the level of offensive odors emanating from the filter media would tend to increase over time, thus causing the consumer to discard the filter element.

Other approaches to overcoming this problem have relied on incorporating the anti-microbial agent into a resin melt and then subsequently spinning the treated resin melt into fibers. This approach requires a slow blooming of the anti-microbial agent out of the fiber before it can be effective. In addition, there is an upper limit regarding the maximum loading of anti-microbial agent which can be incorporated into the fiber without losing adversely affecting the physical properties of the fibers or the performance of the filter element. For example, high loading of anti-microbial agents may interfere with certain electret fiber filter elements.

In addition to filter manufacturers, wound management manufacturers (i.e., bandage and wound dressing manufacturers) have also shown an interest in incorporating an anti-microbial agent into various items, such as gauze wraps, adhesive bandages, and the like. These items are primarily comprised of a fibrous media, such as cotton. In a typical wound situation, various fluids are occasionally released from the wound site, including blood, serum, pus, and the like. Occasionally, these fluids come into contact with pathogens, thus permitting an infection to develop in the area of the wound. Even if these fluids are not present, airborne pathogens may penetrate the bandage (especially during periods of high relative humidity) and come into contact with the wound area, thus initiating an infection. The availability of a selectively active anti-microbial agent to prevent or arrest the development of an infection would enhance the marketability of such items.

Therefore, there exists a need for fibrous media that contains an anti-microbial agent that is capable of diffusing throughout the fibrous media so as to come into contact with the microbial population, especially during periods of relatively high humidity.

SUMMARY OF THE INVENTION

It is an object of the present invention to provide a new and improved fibrous media.

It is another object of the present invention to provide a new and improved fibrous media having an anti-microbial agent contained therein.

It is yet another object of the present invention to provide a new and improved fibrous media having an anti-microbial agent contained therein, wherein the anti-microbial agent is capable of diffusing throughout the fibrous media so as to come into contact with the microbial population, especially during periods of elevated levels of relative humidity.

In accordance with one embodiment of the present invention, a fibrous element is provided, comprising:

at least one container member; and at least one anti-microbial agent disposed within the at least one container member;

wherein the at least one anti-microbial agent is capable of diffusing out of the at least one container member and throughout the fibrous element in response to elevated relative humidity levels in order to contact a microbial population.

In accordance with another embodiment of the present invention, a fibrous element is provided, comprising:

a fibrous mat;

at least one container member, the at least one container member being disposed within the fibrous mat; and at least one anti-microbial agent disposed within the at least one container member;

wherein the at least one anti-microbial agent is capable of diffusing out of the at least one container member and throughout the fibrous mat in response to elevated relative humidity levels in order to contact a microbial population.

In accordance with yet another embodiment of the present invention, a fibrous element is provided, comprising:

a fibrous mat;

at least one container member, the at least one container member being disposed within the fibrous mat, the at least one container member being selected from the group consisting of an elongated fiber having multiple lobes with a longitudinally extending internal cavity including an opening from the internal cavity to the outer fiber formed between adjacent lobes, an elongated fiber having an internal longitudinally extending cavity having a longitudinally extending opening, a particulate, and combinations thereof; and at least one anti-microbial agent disposed within the at least one container member;

wherein the at least one anti-microbial agent is capable of diffusing out of the at least one container member and throughout the fibrous mat in response to elevated relative humidity levels in order to contact a microbial population.

A more complete appreciation of the present invention and its scope can be obtained from the following brief description of the drawings, detailed description of the invention, and the appended claims.

BRIEF DESCRIPTION OF THE DRAWINGS

FIG. 3 is a perspective view showing a first alternative container member which is suitable for practicing the invention;

FIG. 4 is a perspective view showing a second alternative container member which is suitable for practicing the invention; and FIG. 5 is an illustration of a portion of a fibrous mat containing a plurality of several different types of container members disposed therein that can be impregnated with an anti-microbial agent.

DETAILED DESCRIPTION OF THE INVENTION

Figure 1:
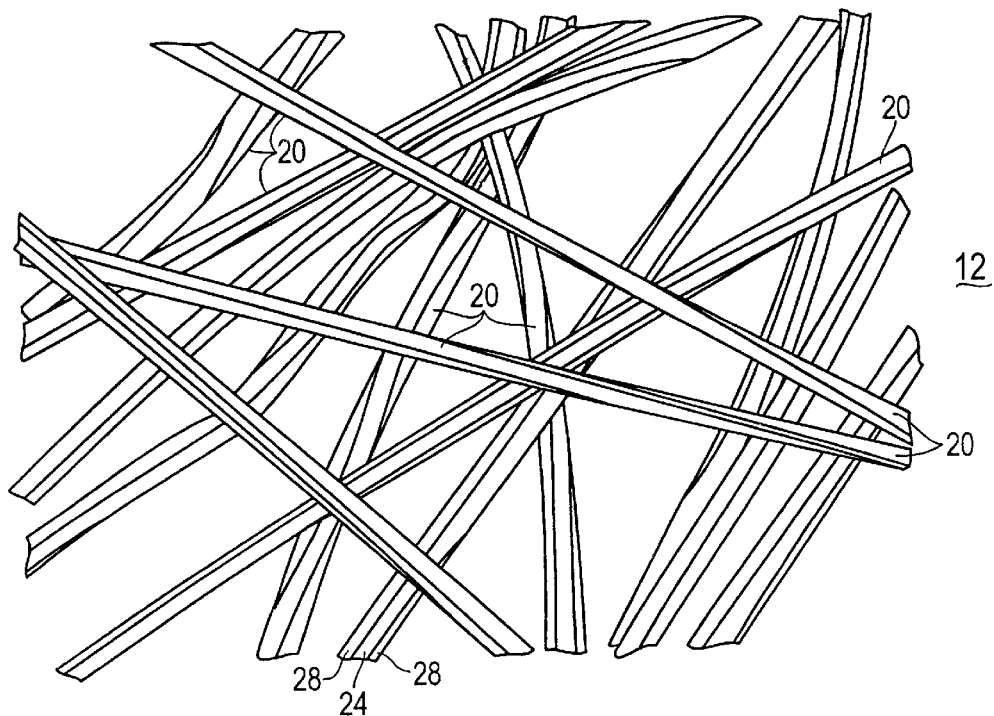
FIG. 1 is an illustration of a portion of a fibrous mat comprised of a plurality of container members that can be impregnated with an anti-microbial agent.

The fibrous element of the present invention is primarily intended to be used to filter particulate matter entrained in a fluid (e.g., gas or liquid) such as an air flow passing through the filter element of a climate control system (e.g., HVAC system). Alternatively, the fibrous element of the present invention can be used as a wound management element (e.g., bandage, wound dressing, and the like).

The fibrous element will generally include one or more layers of a fibrous media that accomplishes the actual filtration, as well as an optional support member, such as a peripheral cardboard or plastic frame or bracket to support the filter media. Additionally, it should be appreciated that the present invention can be practiced with any type of material that is susceptible to the growth of microbial populations thereon.

If the fibrous element is used as a wound management element, optional features, such as an adhesive element may be employed to adhere the fibrous element over the wound area, for example.

The following description will refer primarily to filter elements and/or media; however, the description is equally applicable to wound management elements, as well.

The filter element of the present invention includes two primary components; at least one anti-microbial agent and at least one container member. The term "anti-microbial agent" as used herein is meant to include any substance (or combination of substances) that is capable of either preventing, slowing, or stopping the growth and/or proliferation of any type of microbial population, such as, but not limited to bacteria, fungi, and the like. The term "container member" as used herein is meant to include any substance or structure that is capable of containing, retaining, housing, or supporting any type of anti-microbial agent.

The anti-microbial agent is preferably impregnated into, disposed on, disposed within, or contained within at least a portion of the container member in such a manner so as to be able to be selectively liberated of released from the container member. Therefore, the container member must have some type of ingress and egress means to permit the impregnation and diffusion, respectively, of the anti-microbial agent. The anti-microbial agent can be located on the external surface, internal surface, and/or both surfaces of the container member.

In accordance with one aspect of the present invention, it is preferred that the anti-microbial agent is liberated or released from any of the surfaces of the container member during periods of elevated levels of relative humidity. Thus, the present invention provides a potentially large reservoir of anti-microbial agent which can be readily and rapidly delivered throughout the filter media when relative humidity levels rise.

Without being bound to a particular theory of the operation of the present invention, it is believed that microbial populations thrive on certain filter media when relative humidity levels are elevated (i.e., greater than 50%). Therefore, there is the greatest need for the anti-microbial agent to contact the growing microbial population, which typically initiates growth on an external surface of the filter media. When relative humidity levels are high, the anti-microbial agent leaches or diffuses out of the container member (due, in part, to increased moisture coming into contact with the anti-microbial agent) and becomes mobile. In this manner, the anti-microbial agent can diffuse throughout the filter media (e.g., from the interior towards one or more external surfaces) and come into contact with the microbial population when the need is the greatest. Preferably, the anti-microbial agent will then kill, or at least control, the microbial population and thus avoid the generation of any offensive smells.

Conversely, when the relative humidity levels are low, the anti-microbial agent does not leach or diffuse out, because the corresponding moisture levels are low. Additionally, because the relative humidity level is low, there is substantially less growth of microbial populations, and therefore, there is not as great a need for the anti-microbial agent. Therefore, there is no wasting of the anti-microbial agent during periods when there is no need for it to leach or diffuse out. Thus, the anti-microbial agent is characterized as being selectively active with respect to leaching or diffusing out throughout the filter media.

Examples of suitable anti-microbial agents include, without limitation, any bactericidal agent, bacteriostatic agent, fungicidal agent, fungistatic agent, or the like, that are preferably efficacious against a broad spectrum of microbes. Specific examples of suitable bactericidal/bacteriostatic agents include, without limitation, POLYMYCIN™, BACITRACIN™, lysozyme, TRICLOSAN™, DOWCIDE™, quaternary amine salts, polyphenols, acid-anionic surfactants, amphoteric surfactant disinfectants, biguanidines, and the like. Specific examples of suitable fungicidal/fungistatic agents include, without limitation, dithiocarbamates, phthalimides, dicarboximides, organophosphates, benzimidazoles, carboxanilides, phenylamides, phosphites, and the like.

Examples of suitable container members include, without limitation, elongated fibers having multiple lobes with a longitudinally extending internal cavity including an opening from the internal cavity to the outer fiber formed between adjacent lobes, elongated fibers having an internal longitudinally extending cavity having a longitudinally extending opening, and particulates, both organic and inorganic. Examples of organic particulates include, without limitation, polymeric materials such as thermoplastics (e.g., polystyrene, acrylic copolymers, and the like), hydrogels, and agar gels. Examples of inorganic particulates include, without limitation, silica hydrogels, carbon (e.g., zeolite), aluminas, sintered powders, and the like.

A description of several suitable container members can be found in the following U.S. Patents, the entire specifications of which are all incorporated herein by reference:

U.S. Pat. No. 5,057,368 entitled "Filaments Having Trilobal Or Quadrilobal Cross-Sections" and issued to Largman et al. describes a trilobal or quadrilobal fiber formed from thermoplastic polymers, the fiber having a cross-section comprised of a central core having three or four T-shaped lobes, the legs of each intersecting at the center of the core such that the angle between the legs of adjacent lobes is from about 80° to about 130°.

U.S. Pat. No. 5,704,966 entitled "Method And Apparatus For The Continuous Capturing And Removal Of Gas Molecules" and issued to Rohrbach et al. describes a filtration method and device which continuously removes several gas phase contaminants from an air stream through the use of partially hollow wicking fibers impregnated with a selected liquid which can capture the gas phase contaminants.

U.S. Pat. No. 5,713,971 entitled "Filtration Device Using Absorption For The Removal Of Gas Phase Contaminants" and issued to Rohrbach et al. describes a filter device and technique which rely on absorption rather than adsorption for the removal of gas phase contaminants. A filter media is composed of a plurality of wicking fibers each of which comprise a strand with a hollow region impregnated with any of a variety of liquid phase absorbing systems made from the combination of a carrier liquid and soluble complexing/degrading agent or agents. The filter media may be made from any of a variety of fibers which can rapidly transport a liquid phase by the nature of either their geometry or their chemical composition. Geometries may include multilobal cross-sectional configurations, porous hollow fibers, porous or striated fibers or tightly bundled microfibers, all of which exhibit the property of wicking fluid from an external source.

U.S. Pat. Nos. 5,744,236 and 5,759,394 entitled "Hollow Fibers Impregnated With Solid Particles" and "Elongate Fiber Filter Mechanically Securing Solid Absorbent Particles Between Adjacent Multilobes", respectively, and both issued to Rohrbach et al. describe a non-woven filter media or mat formed from a plurality of elongated generally hollow fibers each having an internal cavity which has an opening, smaller than the cavity width, to the fiber surface and retaining within the internal cavity a large number of relatively small solid particles.

U.S. Pat. Nos. 5,902,384 and 5,951,744 entitled "Wicking Fiber With Solid Particulates For A High Surface Area Odor Removing Filter And Method Of Making" and "Multicomponent Depth Odor Control Filter And Method Of Manufacture", respectively, and both issued to Rohrbach et al. describe a filtration device which continuously removes gas phase contaminants from an air stream through the use of partially hollow wicking fibers impregnated with a fine solid carbon powder or zeolites and formed into a fiber filter with a selected chemisoptive liquid applied to one side of the fiber filter and large carbon particles applied to the other side of the fiber filter.

The impregnated or pregnant container members can either be formed into fibrous mats, sheets, or webs by any number of conventional methods, or alternatively, the pregnant container members can be mechanically incorporated (e.g., disposed) onto and/or within a conventional fibrous mat, sheet, or web (typically comprised of a plurality of entangled non-woven fibers).

Preferably, the resulting filter media, whether comprised of, or incorporating, pregnant fibers and/or particulates is a low density, high pore volume material (e.g., 50% pore volume for fibers and 2–3 cc/g pore volume for particulates). The high pore volume is preferred so as to allow the proper level of air flow through the filter media without a significant pressure drop occurring.

Figure 2:
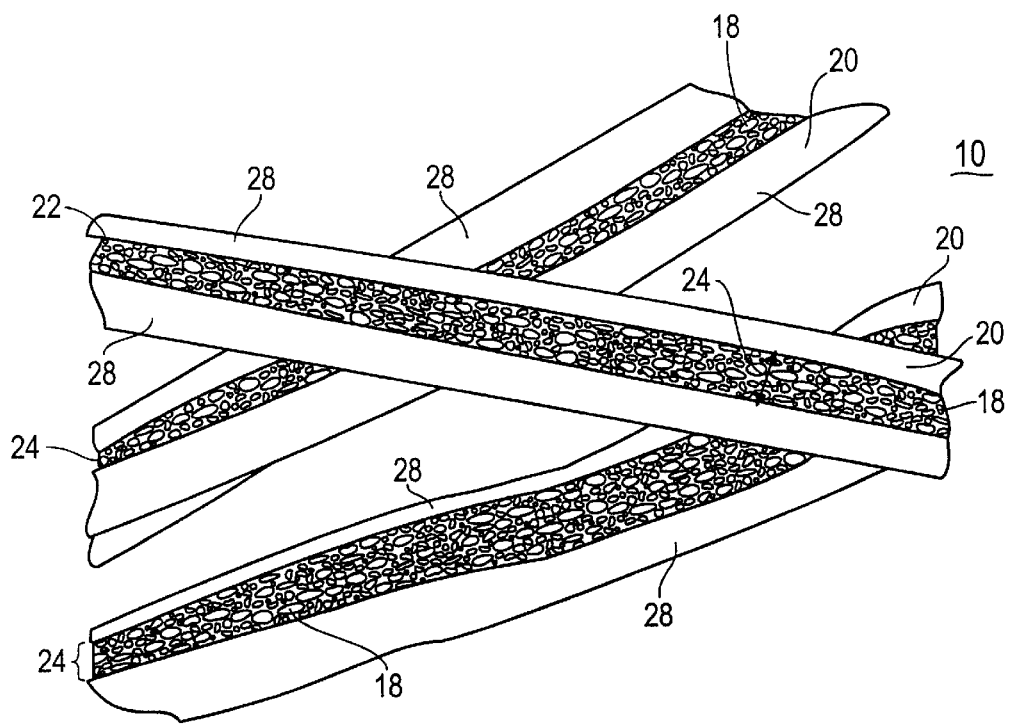
FIG. 2 is an enlarged view of a portion of the fibrous mat shown in FIG. 1.

Referring now to the drawings and FIGS. 1 and 2 in particular, there is shown a fiber mat 10 formed from a plurality of container members 20. The container members 20 are formed into the non-woven mat 10 which can be used as a filter element. Each container member 20 includes an internal cavity 22 within which are disposed the anti-microbial agents 18. A longitudinal opening 24 extends from each cavity 22 to the surface of each container member 20. The multilobal container members 20 are relatively small having a diameter of 250 microns to 10 microns or smaller. The container members 20 shown in FIGS. 1 and 2 are approximately 30 microns in diameter. The size of opening 24 is selected so when anti-microbial agents 18 are disposed in cavity 22 they (meaning the support materials, if any, and not the anti-bacterial agents themselves) are generally permanently entrapped and cannot easily be removed (however, the anti-bacterial agents themselves are able to leach or diffuse out during elevated levels of relative humidity).

Referring now to the drawings and FIG. 3 in particular, a generally hollow container member 40 which is suitable for practicing this invention is shown. The container member 40 has a cross-section with a central core 30 and three (or alternatively four) T-shaped lobes 26 that terminate on an external wall member 28. The legs of the lobes 26 intersect at the core 30 so that the angle between the legs of the adjacent lobes 26 is from about 80° to 130°. The thermoplastic polymer is typically a polyamide, a polyester, a polyolefin or a combination thereof. The container member 40 as illustrated in FIG. 3 is formed as an extruded strand having three hollow interior longitudinally extending cavities 22 each of which communicates with the outer strand surface by way of longitudinally extending slots 24 which are defined between the outer ends of the T-shaped lobes 26. The anti-microbial agents 18 are applied in any number of conventional methods to at least a portion of one or more surfaces of the cavities 22.

Referring now to the drawings and FIG. 4 in particular, a container member 50 which is suitable for practicing this invention is shown. The container member 50 comprises a particulate, for example, a hydrogel. The anti-microbial agents 18 are dispersed throughout the container member 50.

Referring now to the drawings and FIG. 5 in particular, a fiber mat 60 which is suitable for practicing this invention is shown containing, by way of a non-limiting example, container members 20, 40, 50, respectively. The non-woven mat 60 can be used as a filter element. It should be noted that any number of combinations of the various types of container members 20, 40, 50, respectively, may be incorporated into the mat 60. Preferably, the container members 20, 40, 50, respectively, as well as the anti-microbial agents 18 contained therein are compatible with all conventional fiber materials, especially those comprised of electret materials.

The foregoing description is considered illustrative only of the principles of the invention. Furthermore, because numerous modifications and changes will readily occur to those skilled in the art, it is not desired to limit the invention to the exact construction and process shown as described above. Accordingly, all suitable modifications and equivalents that may be resorted to that fall within the scope of the invention as defined by the claims that follow.

What is claimed is:

1. A fibrous element, comprising:
   at least one elongated fiber having at least one internal longitudinally extending cavity having a longitudinally extending opening; and
   at least one anti-microbial agent disposed within said cavity;
   wherein the at least one anti-microbial agent is capable of diffusing out of the at least one cavity and throughout the filter element in response to elevated relative humidity levels in order to contact a microbial population.

2. The invention according to claim 1, wherein the elongated fiber is a fiber having multiple T-shaped lobes and the longitudinally extending opening is formed between adjacent lobes.

3. The invention according to claim 1, wherein the elongated fiber is a fiber having multiple lobes and the longitudinally extending opening is formed between adjacent lobes.

4. The invention according to claim 1, wherein said cavity comprises a particulate.

5. The invention according to claim 4, wherein the particulate comprises a hydrogel.

6. The invention according to claim 1, wherein the at least one elongated fiber is disposed in a filter element.

7. The invention according to claim 1, wherein the at least one elongated fiber is disposed in a wound management element.

8. A fibrous element, comprising:
   a fibrous mat;
   at least one elongated fiber having at lease one internal longitudinally extending cavity having a longitudinally extending opening, the at least one elongated fiber being disposed within the fibrous mat; and
   at least one anti-microbial agent disposed within said cavity;
   wherein the at least one anti-microbial agent is capable of diffusing out of the at least one cavity and throughout the fibrous mat in response to elevated relative humidity levels in order to contact a microbial population.

9. The invention according to claim 8, wherein the at least one elongated fiber is a fiber having multiple T-shaped lobes and the longitudinally extending opening is formed between adjacent lobes.

10. The invention according to claim 8, wherein the elongated fiber is a fiber having multiple lobes and the longitudinally extending opening is formed between adjacent lobes.

11. The invention according to claim 8, wherein said cavity comprises a particulate.

12. The invention according to claim 8, wherein the fibrous mat is disposed in a filter element.

13. The invention according to claim 8, wherein the fibrous mat is disposed in a wound management element.

* * * * *